Nov. 8, 1966   I. CARGNELUTTI   3,283,943
STACKING CONTAINER
Filed May 15, 1964
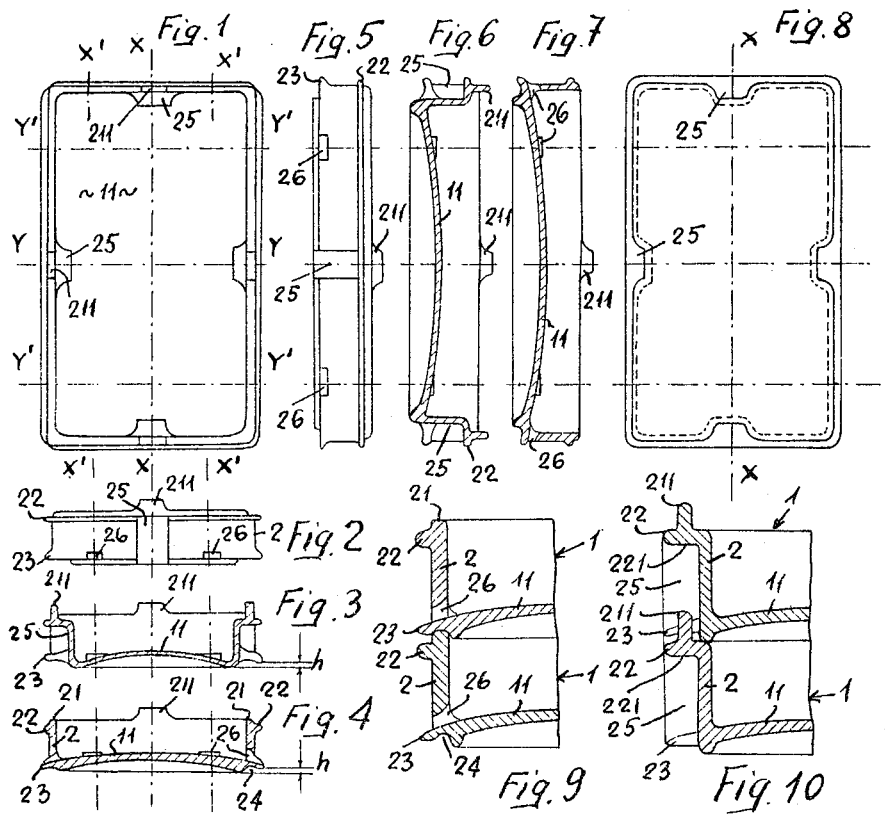
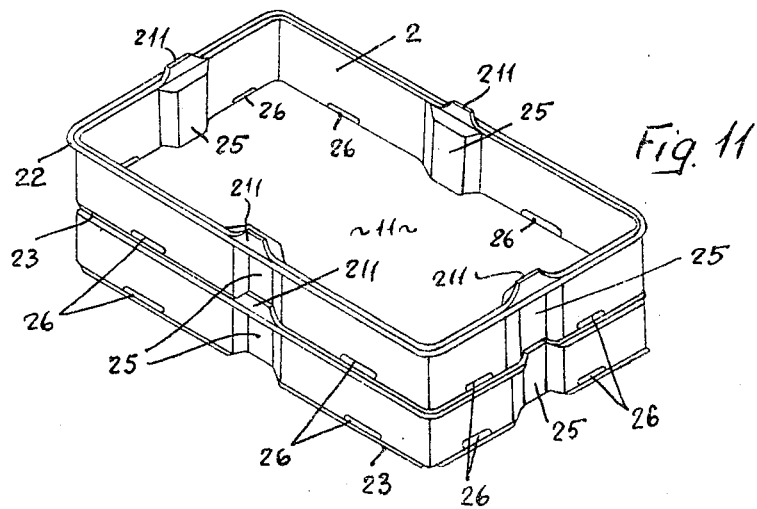

United States Patent Office 3,283,943
Patented Nov. 8, 1966

3,283,943
STACKING CONTAINER
Italo Cargnelutti, 46 Via Dante, Gemona del Friuli, Italy
Filed May 15, 1964, Ser. No. 367,717
4 Claims. (Cl. 220—97)

This invention relates to containers for fish and in particular to containers made of a plastic material.

As it is known, fish is usually transported from the fishing places to the markets in boxes made of wooden laths. Due to the fact that said laths are not planed and therefore present a rough and fibrous surface and due to the fact that between the laths which are badly joined and twisted in all directions numerous interstices are formed, it is not possible to clean the boxes perfectly by completely removing every fish remainder, to which the porosity of the wood should be added which, even if thoroughly washed and scrubbed, comes to be impregnated with bad smells and putrescent liquors.

It is a main object of the present invention to provide a container for fish made of plastic material which completely and radically eliminates the above-mentioned inconveniences and presents hard, smooth and non-absorbent surfaces, which are connected between them with the exclusion of sharp angles.

According to the invention there is provided a container particularly for fish, which is made of plastic material and has a rectangular shape with a convex bottom, an upper perimetrical rib provided at the exterior a little below its edge and a lower perimetrical rib provided at the level of the bottom, while in an intermediate position of the four walls a hollow portion is provided which, originating from the bottom, extends up from the bottom to the upper rib which closes said hollow like a roofing, and projection of the container edge is provided in correspondence of the hollow portions, so as to form four teeth having a suitable height and width.

There is thus rendered possible the perfect washing of the container, with the reliable removal of even every small fish remainder or trace, so that after washing, the container is odourless. Stacking of the containers and their gripping with the hands for transportation and lifting is rendered easy.

In order that the invention may be more clearly understood an embodiment thereof will now be described, by way of example, with reference to the accompanying drawings in which:

FIGURE 1 is a top plan view of a container according to the invention,

FIGURES 2, 3 and 4 are respectively an elevation of the container viewed from the smallest side and two cross sections taken on lines Y—Y and Y'—Y', FIGURES 5, 6 and 7 are respectively an elevation of the container from its largest side and two longitudinal sections on lines X—X and X'—X', FIGURE 8 is a bottom view of the container, FIGURE 9 is a section on lines X'—X' or Y'—Y' of the walls of two superposed containers, FIGURE 10 is a section on lines X—X and Y—Y of the walls of two superposed containers, and FIGURE 11 shows in perspective a top view of two superposed containers.

Referring to the drawings, a container 1 is made of plastic material and is manufactured in a single piece. The container, which has a rectangular shape, has its bottom 11 which is convex both along the longitudinal midline X—X and along the transversal midline Y—Y, for the purpose of collecting along the perimetrical inside rounded corner, liquors, from the fish and cooling ice and to allow same to flow out through slits 26 provided in the walls on axes X'—X' and Y'—Y'.

Wall 2 is formed at its top, slightly below its edge 21, with an outer perimetrical stiffening rib 22. Another rib 23, also perimetrical and external, is provided at the level of the bottom of the container. A perimetrical semi-circular groove 24 is formed under the bottom and in correspondence with the walls (see FIGURES 4 and 9).

In an intermediate position of the four walls, viz in correspondence of the axes X—X and Y—Y, the walls are provided with a hollow part 25 having a preferably trapezoidal shape, and said hollows originate from the container bottom, whereby they interrupt the lower rib 23 and arrive to the top rib 22 which forms a roofing 221 over the hollow parts (see FIGURES 3, 6 and 10). Upon the top face of said roofing, the edge 21 protrudes upwardly for a short distance and forms a tooth 211 having a predetermined height and width.

Due to said hollows 25 and roofing 221, an efficient hand grip is obtained, for lifting and transportation of the containers, whereas when these are stacked upon each other, the penetration of the teeth 211 of the underlying ones into the hollows 25 of these stacked thereabove is obtained and this fact, in addition to the reciprocal encasing of the edges 21 into the perimetrical grooves 24 prevents any shifting of the stacked containers with respect to each other.

The lower perimetrical rib 23 serves as a gutter for the liquors flowing out of the slits 26, for the purpose of preventing, when the containers are stacked, liquid discharged from the upper containers flowing into the lowermost containers. In order to prevent the rib from supporting loads, it extends slightly above the bottom, as indicated by $h$ in FIGURE 4.

It is apparent that, due to the convexity of the bottom and of the perimetrical ribs, large and considerably rugged containers of plastic material may be obtained, notwithstanding the fact that small thicknesses of material are adopted, and this completely to the advantage of the weight and therefore of the transportation costs.

I claim:
1. A rectangular container having a bottom and four side walls, and in which the bottom is convex both in longitudinal and transversal direction; an upper perimetrical rib all around said side walls, a little below their top edge; a lower perimetrical rib provided all around said side walls at the level of the junction surface of the bottom with said walls, but interrupted for a certain length in an intermediate position of the said four side walls, a hollow portion in correspondence of each of said intermediate position, said hollow portion originating from the bottom end of each of said container walls and extending up to the said upper rib, which closes said hollow like a roofing and a projection of the container side walls edge provided in correspondence of their hollow portions and forming four teeth having such a height and width as to penetrate into the said hollow portions of the side walls when the containers are stacked, thus preventing side shifting of the stacked containers.

2. A container according to claim 1, further comprising at the exterior of the bottom a perimetrical groove adapted to fit onto the top edges of the side walls of an underlying container, thus contributing, in addition of the insertion of the said four teeth projecting above the side walls and penetrating into the said hollow portions of said side walls, to prevent shifting of the stacked containers.

3. A container according to claim 1, in which said roofing-like ribs are so formed as to constitute two pairs of hand grips, one across the longitudinal midline and the other across the transversal midline of said container.

4. A container according to claim 1, in which the junction surface of the said walls with the bottom is rounded and said side walls are provided at level of said bottom with slits opening at the exterior above said bottom perimetrical ribs.

References Cited by the Examiner

UNITED STATES PATENTS

| | | | |
|---|---|---|---|
| 1,944,827 | 1/1934 | Osherman | 220—97 |
| 3,013,692 | 12/1961 | Chesley | 220—97 |
| 3,147,882 | 8/1964 | Waters | 220—97 |

FOREIGN PATENTS 1,349,646  12/1963  France.

THERON E. CONDON, *Primary Examiner.*

G. E. LOWRANCE, *Assistant Examiner.*